(12) United States Patent
Jainek

(10) Patent No.: US 11,305,219 B2
(45) Date of Patent: Apr. 19, 2022

(54) FILTER SYSTEM AND FILTER ELEMENT

(71) Applicant: MANN+HUMMEL GmbH, Ludwigsburg (DE)

(72) Inventor: Herbert Jainek, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 8 days.

(21) Appl. No.: 16/409,045

(22) Filed: May 10, 2019

(65) Prior Publication Data
US 2019/0262751 A1 Aug. 29, 2019

Related U.S. Application Data

(63) Continuation of application No. PCT/EP2017/078896, filed on Nov. 10, 2017.

(30) Foreign Application Priority Data

Nov. 11, 2016 (DE) .......................... 102016013388.0

(51) Int. Cl.
*B01D 35/16* (2006.01)
*B01D 35/153* (2006.01)
(Continued)

(52) U.S. Cl.
CPC ........... *B01D 35/16* (2013.01); *B01D 35/153* (2013.01); *B01D 35/30* (2013.01);
(Continued)

(58) Field of Classification Search
CPC ...... B01D 35/005; B01D 35/16; B01D 35/30; B01D 35/306; B01D 2201/291; B01D 2201/295
(Continued)

(56) References Cited

U.S. PATENT DOCUMENTS 7,820,044 B2 * 10/2010 Nawa .................... B01D 35/153
210/232
9,333,448 B2 5/2016 Braunheim et al.
(Continued)

FOREIGN PATENT DOCUMENTS

DE 10235902 A1 2/2004
DE 10353424 A1 6/2005
(Continued)

*Primary Examiner* — Benjamin M Kurtz

(57) ABSTRACT

A filter system for liquid media has a filter housing with housing pot and housing cover. The housing pot has a drainage channel with bottom-side drainage opening. A bottom end disk of a filter element has a closure element arranged off-center to a longitudinal filter element axis. The closure element, in predetermined installation position of the filter element, extends seal-tightly across or into the drainage opening. The bottom end disk has a cutout corresponding with a positioning aid of the housing pot. By screwing on the housing cover, the filter element moves with the housing cover axially toward the drainage opening and rotates until positioning aid and cutout engage and lock the filter element relative to the housing pot in a predetermined rotational position where the closure element is axially aligned with the drainage opening. The filter element moves with the housing cover axially into the predetermined installation position.

14 Claims, 7 Drawing Sheets

(51) Int. Cl.
  *B01D 35/30* (2006.01)
  *B01D 35/00* (2006.01)

(52) U.S. Cl.
  CPC .. *B01D 2201/291* (2013.01); *B01D 2201/316* (2013.01); *B01D 2201/4007* (2013.01); *B01D 2201/4046* (2013.01); *B01D 2201/4092* (2013.01); *B01D 2201/52* (2013.01)

(58) Field of Classification Search
  USPC .................................................. 210/236, 248
  See application file for complete search history.

(56) References Cited

U.S. PATENT DOCUMENTS

| | | | |
|---|---|---|---|
| 2004/0094464 A1 | 5/2004 | Baumann et al. | |
| 2010/0282665 A1 | 11/2010 | Pradel et al. | |
| 2012/0223006 A1 | 9/2012 | Sann et al. | |
| 2012/0261326 A1* | 10/2012 | Deschamps | B01D 35/30 |
| | | | 210/236 |
| 2014/0260136 A1 | 9/2014 | Kaiser | |

FOREIGN PATENT DOCUMENTS

| | | |
|---|---|---|
| DE | 102007009352 A1 | 8/2008 |
| DE | 102009049868 A1 | 4/2011 |
| DE | 102011088742 A1 | 6/2013 |
| DE | 102013202446 A1 | 8/2014 |
| DE | 102013209662 A1 | 11/2014 |
| EP | 0899452 B1 | 3/1999 |
| EP | 1792646 B1 | 6/2007 |
| EP | 2353692 A2 | 8/2011 |
| EP | 2604321 A1 | 6/2013 |
| EP | 2783738 A1 | 10/2014 |
| GB | 1301064 A | 12/1972 |
| WO | 2011113723 A1 | 9/2011 |
| WO | 2014029811 A1 | 2/2014 |
| WO | 2014124974 A1 | 8/2014 |

* cited by examiner

FILTER SYSTEM AND FILTER ELEMENT

CROSS-REFERENCE TO RELATED APPLICATIONS

This application is a continuation application of international application No. PCT/EP2017/078896 having an international filing date of 10 Nov. 2017 and designating the United States, the international application claiming a priority date of 11 Nov. 2016 based on prior filed German patent application No. 10 2016 013 388.0, the entire contents of the aforesaid international application and the aforesaid German patent application being incorporated herein by reference.

BACKGROUND OF THE INVENTION

The invention concerns a filter system for a liquid medium to be filtered, in particular fuel or oil, in particular for an internal combustion engine. The filter system comprises a filter housing with a housing pot and with a housing cover that can be screwed onto the housing pot or can be screwed into the housing pot by a screwing movement in order to close off the housing pot. The housing pot comprises a drainage channel with a bottom-side drainage opening for the liquid medium. In the filter housing, a filter element can be arranged that, at its bottom end disk, comprises a closure element that is arranged off-center relative to the longitudinal axis of the filter element and which, in a predetermined installation position of the filter element in the filter housing, extends seal-tightly across the bottom-side drainage opening of the drainage channel of the housing pot or extends seal-tightly into the bottom-side drainage opening of the drainage channel. Moreover, the invention concerns a filter element.

DE 10 2011 088 742 A1 discloses a filter element with an end disk which comprises a rim-side positioning contour. In order to mount the filter element in the filter housing, the filter element must first be aligned properly at the filter housing before the filter element can be inserted into the filter housing. Assembly of the filter system is therefore comparatively uncomfortable and difficult.

DE 10 2009 049 868 A1 discloses a further filter system in which the filter pot is provided with a sleeve. The sleeve comprises a groove. A filter element to be arranged in the filter pot comprises at the inner side a guide element that must be manually aligned relative to the groove of the filter housing sleeve in a complicated way in order to insert the filter element into the filter housing. The sleeve arranged fixedly at the housing causes moreover a cross-sectional constriction of the filter pot and thus an undesirable pressure loss of the fluid flowing through the filter system. The filter element comprises at its bottom end disk an eccentrically arranged closure plug for closing off a filter housing-associated drainage channel for the fluid.

As disposable parts, the filter elements employed in filter systems must be exchangeable as needed in a simple, quick, and reliable way. At the same time, considering the plurality of types of filter elements in the automotive field, a use of an unsuitable filter element must be reliably prevented in order to avoid malfunction as well as damage to downstream devices.

SUMMARY OF THE INVENTION

The invention has therefore the object to provide a filter system of the aforementioned kind that enables a particularly quick, simple, and reliable mounting of the filter element in the filter housing and that, at the same time, prevents the use of an unsuitable filter element. Moreover, a filter element for such a filter system is to be provided.

The object concerning the filter system is solved by a filter system of the afore mentioned kind comprising:

a filter housing with a housing pot and with a housing cover that can be screwed by means of a screwing movement onto the housing pot or can be screwed into the housing pot in order to close off the housing pot, wherein the housing pot comprises a drainage channel with a bottom-side drainage opening for the liquid medium;

a filter element that, at its bottom end disk, comprises a closure element that is arranged off-center relative to the longitudinal axis of the filter element and which, in a predetermined installation position of the filter element in the filter housing, extends seal-tightly across a bottom-side drainage opening of the drainage channel of the housing pot or extends seal-tightly into the bottom-side drainage opening of the drainage channel of the housing pot;

wherein the bottom end disk of the filter element comprises a cutout and the housing pot comprises a positioning aid corresponding with the cutout;

wherein the filter element by means of the screwing movement of the housing cover is movable axially in the direction toward the drainage opening and can be rotated, together with the housing cover, about its longitudinal axis until the positioning aid engages the cutout of the bottom end disk and locks the filter element relative to the housing pot in a predetermined rotational position in which the closure element is axially aligned relative to the drainage opening; and wherein the filter element by means of the screwing movement of the housing cover is movable in axial direction into its predetermined installation position in the filter housing.

The filter element according to the invention for the filter system according to the invention is characterized in that a closure element is arranged at a bottom end disk of the filter element, wherein the closure element is arranged off-center relative to the longitudinal axis of the filter element, wherein the bottom end disk of the filter element comprises a socket which extends in axial direction away from the bottom end disk and which is provided with a cutout.

Further embodiments of the invention are indicated in the dependent claims as well as in the description.

The filter system according to the invention serves for filtering a liquid medium, preferably for filtering fuel or oil, in particular for an internal combustion engine. The filter system comprises a filter housing with a housing pot and with a housing cover which can be screwed onto the housing pot or can be screwed into the housing pot by means of a screwing movement in order to close off the housing pot. A filter element can be arranged in the filter housing. The filter pot comprises a drainage channel with a bottom-side drainage opening for the liquid medium. Upon removal of the filter element, the drainage opening enables drainage of the liquid medium disposed at the raw side or even at the clean side in the filter housing. The filter element comprises at its bottom end disk a cutout and a closure element that is arranged off-center relative to the longitudinal axis of the filter element. The closure element, in a predetermined operating or installation position of the filter element in the filter housing, extends seal-tightly across the bottom-side drainage opening of the drainage channel of the housing pot or extends seal-tightly into the bottom-side drainage opening of the drainage channel of the housing pot. The drainage channel is thus fluid-tightly closed off by the filter element in filtering operation of the filter system. The housing pot comprises a positioning aid for the filter element that corresponds with the cutout of the filter element. By means of the screwing movement of the housing cover, the filter element is movable together with the housing cover axially in the direction toward the drainage opening and can be rotated about its longitudinal axis so far that the positioning aid, preferably in axial direction, engages the cutout of the bottom end disk in order to lock the filter element in a predetermined rotational position with the closure element axially aligned relative to the drainage opening. Solely by means of the screw-in movement of the housing cover, the filter element is moveable into its predetermined installation position in the filter housing in which the closure element is extending seal-tightly across the bottom-side drainage opening of the drainage channel of the housing pot or is extending seal-tightly into the bottom-side drainage opening of the drainage channel of the housing pot in axial direction. The sealing surface of the closure element and the axial end of the cutout are arranged so as to be spaced apart relative to the longitudinal axis of the filter housing.

In the filter system according to the invention, by means of the housing cover the filter element, upon screwing the housing cover into/onto the housing pot, can first be exactly axially aligned with its closure element relative to the drainage opening without further action by an operator and, with a continued screw-in movement, i.e., screwing on tightly the housing cover at the housing pot, can be transferred mandatorily into its intended installation position. For this purpose, the filter element is preferably secured at the housing cover with friction fit and/or form fit, in particular is locked thereat. Alternatively, the filter element is held with friction fit and/or form fit, in particular locked, at an additional component, for example, a valve holder for a bypass valve, which in turn is connected to the housing cover.

The arrangement of the drainage opening of the drainage channel in the housing pot relative to the positioning aid at the housing pot corresponds with the arrangement of the closure element at the filter element relative to the cutout of the bottom end disk of the filter element.

It is understood that the housing cover and the housing pot have threads corresponding with each other.

The closure element can be designed in a plurality of ways. For example, the closure element in an advantageous embodiment can be configured in the form of a closure plug, for example, cylinder-shaped but also of parallelepipedal shape, which in a predetermined operating or installation position of the filter element in the filter housing extends seal-tightly into the drainage channel of the housing pot. At its free end, the closure plug can have a tapered section in order to facilitate insertion of the closure plug into the drainage opening. The closure plug can comprise an additional sealing element, for example, a radially acting O-ring, in order to improve the seal-tightness of the closure.

In a particularly advantageous embodiment, the closure element, in a predetermined operating or installation position of the filter element in the filter housing, extends seal-tightly across the bottom-side drainage opening of the housing pot. The closure element can have a bell shape or the shape of a bowl or of a cone or hollow cone. Mixed forms of these contours are possible also in order to enable an advantageous sealing action of the drainage opening in operation. The closure element is comprised of or comprises advantageously sealing material. As sealing material, the rubber or elastomer materials are conceivable that are conventional in the field of internal combustion engines. It is understood that the sealing material may comprise additives and/or reinforcement elements. Due to the bell-shaped configuration as well as the flexible deformability of the closure element, even larger dimensional tolerances of the sealing surface can be compensated and a reliable sealing action can be ensured.

In the filter system according to the invention, a faulty installation of a suitable filter element can be as reliably counteracted as the installation of an unsuitable filter element.

According to a particularly preferred further embodiment of the invention, the bottom end disk of the filter element comprises an annular rib or a socket which extends in axial direction away from the bottom end disk and which is provided with a cutout. In this way, on the one hand, a particularly long and safe rotationally fixed locking of the filter element at the positioning aid can be achieved. On the other hand, the bottom end disk can be even further reinforced by such an annular rib or such a socket without noteworthy additional material expenditure. A structural weakening of the bottom end disk due to the cutout is therefore avoided in this case. Moreover, with such an end disk socket or such an annular rib it can be achieved that the screwing movement in the case of use of an unsuitable filter element is blocked early on during installation and a user therefore is reliably alerted in regard to the installation of an unsuitable filter element.

The socket can be embodied with regard to manufacture-technological aspects in particular in an annular shape, preferably cylindrical. In a preferred embodiment, the annular rib or the socket is embodied as a cylindrical section about the longitudinal axis of the filter element with an end face perpendicular to the longitudinal axis, i.e., without a slanted guiding surface such as, for example, a coil or ramp.

The bottom end disk can be embodied as one piece and can form directly the cutout, the annular rib or the socket, and/or the receptacle for the closure element. Alternatively, the bottom end disk can be of a multi-part configuration, wherein the parts of the bottom end disk are connected fixedly, in particular rotationally fixedly, and non-detachably by means of a locking or weld connection. In a particular embodiment, the bottom end disk of the filter element is produced by 2K plastic injection molding technology.

According to the invention, the cutout of the bottom end disk of the filter element can be embodied in a slot shape at least in sections. In this way, the filter element with its closure element can be axially aligned particularly precisely relative to the drainage opening. A particular advantage results when the cutout has lateral flanks which are beveled at least at the inlet side. In this way, for example, during the screwing movement an undesirable catching and/or canting of the filter element at the positioning aid can be counteracted. It is particularly advantageous when a lateral flank is beveled such that an insertion movement of the positioning aid into the cutout is assisted by the bevel during the screwing movement.

The arrangement of the annular rib or of the socket at the bottom end disk of the filter element and of the positioning aid at the housing pot, in particular the height of the annular rib or of the socket, on the one hand, and the height of the positioning aid for the filter element at the housing pot that corresponds with the cutout of the filter element, on the other hand, are matched in an advantageous embodiment such that the threads at the housing cover and at the housing pot engage each other only after positioning aid and cutout correspond so that the housing pot and housing cover can be screwed to each other only when the positioning aid registers with the cutout. In this way, the filter element is movable axially in the direction toward the housing pot bottom while the cutout at the element and the positioning aid at the housing pot are in engagement. The distance that the filter element can travel axially after engagement results from the axial extension of the cutout in the annular rib or the socket and the axial extension of the positioning aid.

When the cover rotates in screw-in direction, the filter element rotates about the longitudinal axis of the filter element due to the friction-fit connection of the housing cover and filter element when cutout and positioning aid are not yet in engagement. In this context, the free rim of the annular rib or of the socket is in contact with the corresponding surface of the positioning aid and prevents a movement in axial direction. In this way, it is ensured that the housing cover can be screwed onto the housing pot or into the housing pot only when a suitable filter element is arranged in the filter housing.

In regard to manufacture-technological aspects, the annular rib or the socket and the bottom end disk of the filter element are advantageously embodied in a one-piece configuration with each other. In this way, the bottom end disk together with the socket can be inexpensively and simply produced, for example, as an injection molded part. The number of individual elements and thus the number of working steps for mounting a filter element or filter system according to the invention are reduced in this way. Moreover, in this configuration it is not necessary that the socket or the annular rib be aligned with the cutout in a specific rotational position relative to the bottom end disk and held in a fixed position in a cumbersome way when mounting the filter element in the filter housing.

The positioning aid is embodied particularly preferred as a pin-type or rib-type housing projection of the housing pot. Preferably, the positioning aid for this purpose extends away from the housing bottom of the housing pot. In another embodiment, the positioning aid projects away from the inner circumferential surface of the housing pot in radial direction inwardly.

In an alternative embodiment of the invention with identical function, the housing pot can have an annular rib or a socket and the filter element a positioning aid, for example, in the form of a pin-type or rib-type projection.

The housing pot can comprise according to the invention a (housing-fixed) housing sleeve. Due to the housing sleeve, the filter element when being mounted can be aligned and centered in a simple way in the filter housing. The positioning aid in this context is preferably outwardly displaced in radial direction relative to the housing sleeve. In this way, the positioning aid is radially spaced apart from the housing sleeve so that the positioning aid and the cutout of the filter element can be arranged substantially freely, in particular independent of position and size of the housing sleeve.

A particularly inexpensive manufacture of the filter system results moreover when the positioning aid and the housing pot are embodied as one piece, for example, as an injection molded part. In regard to an inexpensive mass production, the filter housing or filter pot can be made in particular of a plastic material.

A particular advantage results moreover when the housing pot comprises a guide element for the closure element in order to secure the closure element in its position axially aligned relative to the drainage opening or to facilitate an insertion of a closure plug into the drainage opening or lowering of a bell-shaped closure element onto the drainage opening. In this context, the guide element is arranged behind the drainage opening in the direction of the screwing movement of the housing cover. The guide element according to the invention projects preferably away from the housing bottom of the housing pot in axial direction. It is understood that the dimensions of the guide element, in particular its height, can be selected in this context such that, on the one hand, safe guiding of the closure element is ensured and, on the other hand, the filter element however does not impact the guide element or contact the latter in axial direction too early during the screwing movement.

By means of the guide element, damage to the closure element can be reliably counteracted.

The closure element can be embodied as a sealing element. The connection of the sealing element with the filter element can be realized in that the bottom end disk of the filter element is embedded by injection molding in a sealing material or the sealing material is injection molded onto the bottom end disk. Alternatively, the closure element comprises a holding section which extends through a through passage in the bottom end disk. For example, the closure element can be form-fitted to the bottom end disk, i.e., can be pulled with a thicker diameter section through a smaller sized opening in the bottom end disk and held with form fit.

BRIEF DESCRIPTION OF THE DRAWINGS

In the following, the invention is explained with the aid of two embodiments illustrated in the drawings. The reference characters of the second embodiment have a numbering increased by 100 relative to the first embodiment.

DESCRIPTION OF PREFERRED EMBODIMENTS

Figure 1:
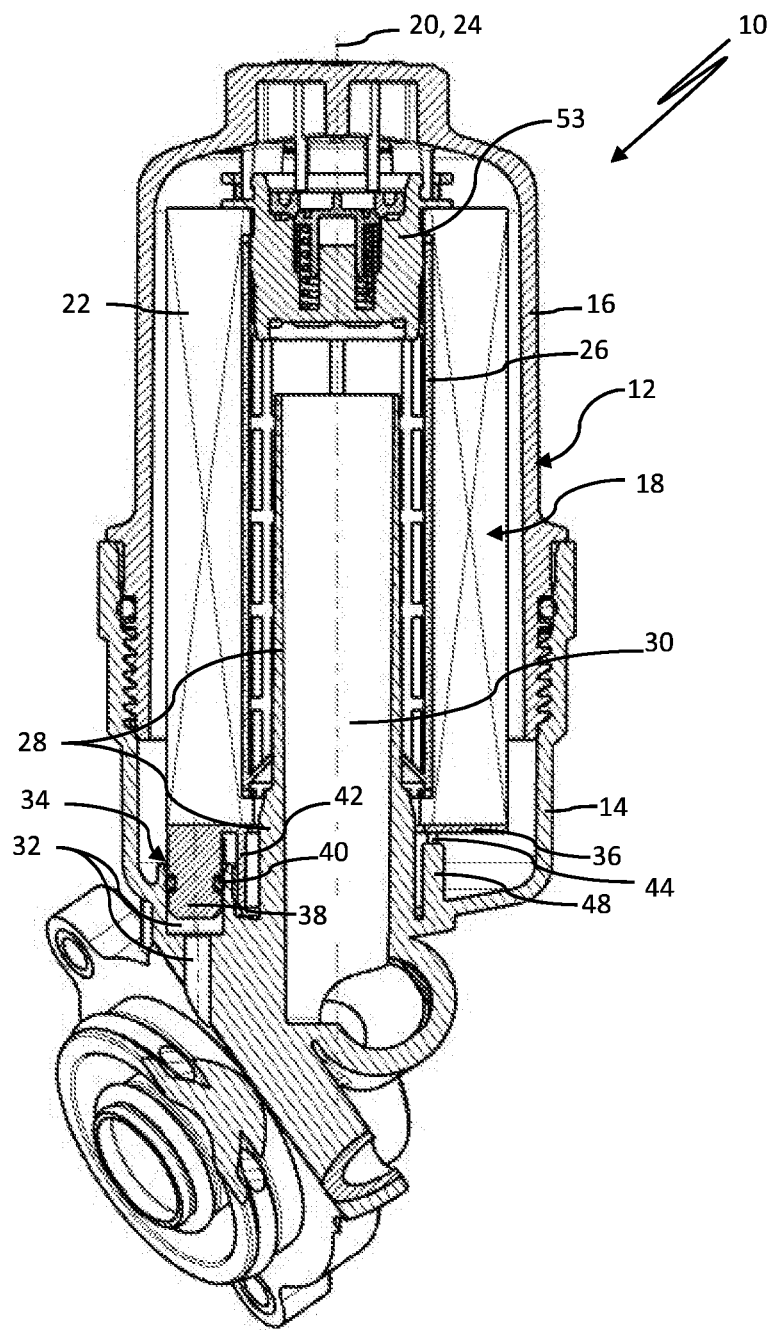
FIG. 1 shows an embodiment of a first filter system with a filter housing as well as a filter element arranged in the filter housing in its predetermined installation position with a closure element embodied as a closure plug, in a section illustration.

FIG. 1 shows a filter system 10 for a liquid medium to be filtered, in particular fuel or oil. The filter system 10 comprises a filter housing 12 with a housing pot (filter pot) 14 and with a housing cover 16 for closing off the housing pot 14. Here, the housing cover 16 can be screwed into the housing pot 14 but can also be designed to screw onto the housing pot 14. In the filter housing 12, a filter element 18 is arranged in its predetermined installation or operating position. The longitudinal axis 20 of the filter housing 12 is indicated. The filter element 18 comprises a filter medium 22 which is suitable for the respective liquid medium to be filtered. The filter medium 22 is arranged in an annular shape relative to the longitudinal axis 24 of the filter element 18. The filter element 18 is thus designed as a round filter element. The filter medium 22 in filtering operation of the filter system 10 can be flowed through by the liquid medium to be filtered in a radial direction relative to the longitudinal axis 24 of the filter element 18 from the exterior to the interior. In order to have a filter surface area as large as possible, the filter medium 22 can be designed, as is generally known, as a star-shaped folded bellows. A grid-shaped support tube 26 serves as a radial inner support of the filter medium 22.

The housing pot (filter pot) 14 comprises at the bottom side a centrally arranged housing sleeve 28 with a clean-side outlet channel 30 for the filtered liquid medium. In case of filter element exchange, a drainage channel 32 with a drainage opening 34 serves for draining the liquid medium, disposed in the filter housing 12 or in the filter element 18, from the filter housing 12. By means of the housing sleeve 28, an undesirable transfer of unfiltered (raw-side) liquid medium into the outlet channel 30 at the clean side can be prevented in this context. The drainage opening 34 according to FIG. 1 is arranged in radial direction at a spacing from the centrally arranged housing sleeve 28.

The filter element 18 comprises a bottom end disk 36 which covers the filter medium 22 in axial direction preferably completely. The filter medium 22 can be glued to the bottom end disk 36, welded thereto, or can be arranged so as to be held by being embedded in the material of the bottom end disk 36. The bottom end disk 36 can be comprised, for example, of plastic material. A closure pin or closure plug 36 is integrally formed off-center at the bottom end disk 36 and is extending away from the bottom end disk 36 in axial direction. An annular sealing element 40 can be arranged at the closure plug 38. The sealing element 40 is embodied in this context preferably as a radial sealing element. In the illustrated operational state of the filter system 10, the closure plug extends seal-tightly through the drainage opening 34 of the drainage channel 32 into the drainage channel 32. In operational state of the filter system 10, the drainage channel 32 is thus fluid-tightly closed by the filter element 18.

Figure 2:
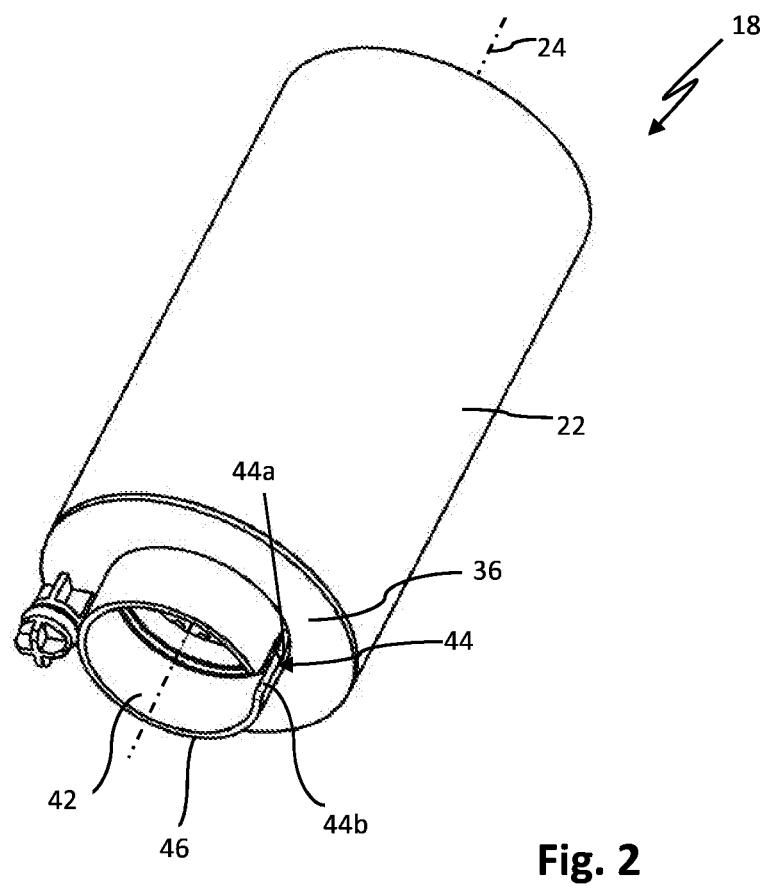
FIG. 2 shows the filter element of FIG. 1 in an isolated perspective view.

According to FIG. 1, an annular socket 42 is integrally formed at the bottom end disk 36 of the filter element 18. According to the isolated view of the filter element in FIG. 2, the socket 42 is in the form of a cylindrical collar having a planar axially outer free rim and extends in axial direction away from the bottom end disk 36 of the filter element 18. The socket 42 comprises a cutout identified by 44. The cutout 44 according to FIG. 2 is embodied in the form of a slot which extends away from the free rim 46 of the socket 42 in axial direction. The cutout 44 can extend all the way up to the bottom end disk 36. The cutout 44 is laterally delimited by two lateral flanks 44a, 44b which can be beveled at their rim.

Figure 3:
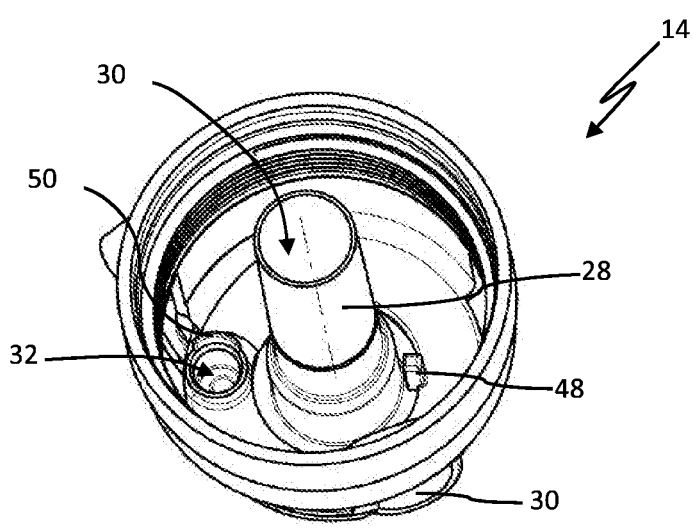
FIG. 3 shows the filter pot of the filter system according to FIG. 1 in an isolated perspective view.

The housing pot (filter pot) 14 comprises according to FIG. 1 a pin-shaped or plug-shaped positioning aid 48 for the filter element 18 which can be seen well in the perspective view of the housing pot 14 illustrated in FIG. 3. In relation to the housing sleeve 28, the positioning aid 48 is displaced outwardly in radial direction. The positioning aid 48 can extend in particular in axial direction away from the bottom side of housing pot 14 and is preferably integrally formed on the housing pot 14 for manufacture-technological reasons. In operational state of the filter system 10 (FIG. 1), the positioning aid 48 engages the cutout 44 of the socket 42 of the filter element 18. It is understood that the positioning aid 48 can comprise a conical or wedge-shaped form in order to facilitate engagement of the positioning aid 48 in the cutout 44.

In the drawing, the respective diametrically opposed arrangement of the drainage opening 34 and of the positioning aid 48 of the housing pot 14 as well as of the closure plug 38 and of the cutout 44 of the filter element 18 is to be understood purely as an example. It is important that the closure plug 38 and the cutout 44 of the filter element 18 comprise a spatial distribution pattern which corresponds to the spatial distribution pattern of the drainage opening 34 of the drainage channel 32 and of the positioning aid 48 of the housing pot 14. In operational state of the filter system 10, the simultaneous engagement of the closure plug 38 of the filter element 18 in the housing-associated drainage opening 34 of the drainage channel 32 and of the positioning aid 48 of the housing pot 14 in the cutout 44 of the filter element 18 is thereby ensured.

According to FIG. 3, the housing pot 14 can comprise at the bottom side a guide element 50 especially for the closure plug 38 of the filter element 18. The guide element 50 is preferably formed integrally at the housing pot 14. The guide element 50 is projecting away from the bottom side of the housing pot 14 in axial direction and serves for ease of insertion of the closure plug 38 into the drainage opening 34 or the drainage channel 32. By means of the guide element 50, damage to the closure plug 38, in particular shearing off of the sealing element 40 from the closure plug 38, can be counteracted. The guide element 50 is located in the screw-in direction 52 of the housing cover 16 directly behind the drainage opening 34 and therefore can serve as an additional stop element for the closure plug 38. The guide element 50 can moreover be arranged so as to extend slightly at a slant relative to the longitudinal axis 20 of the filter housing 12 in order to serve thus functionally as an insertion ramp for the closure plug 38.

Figure 4:
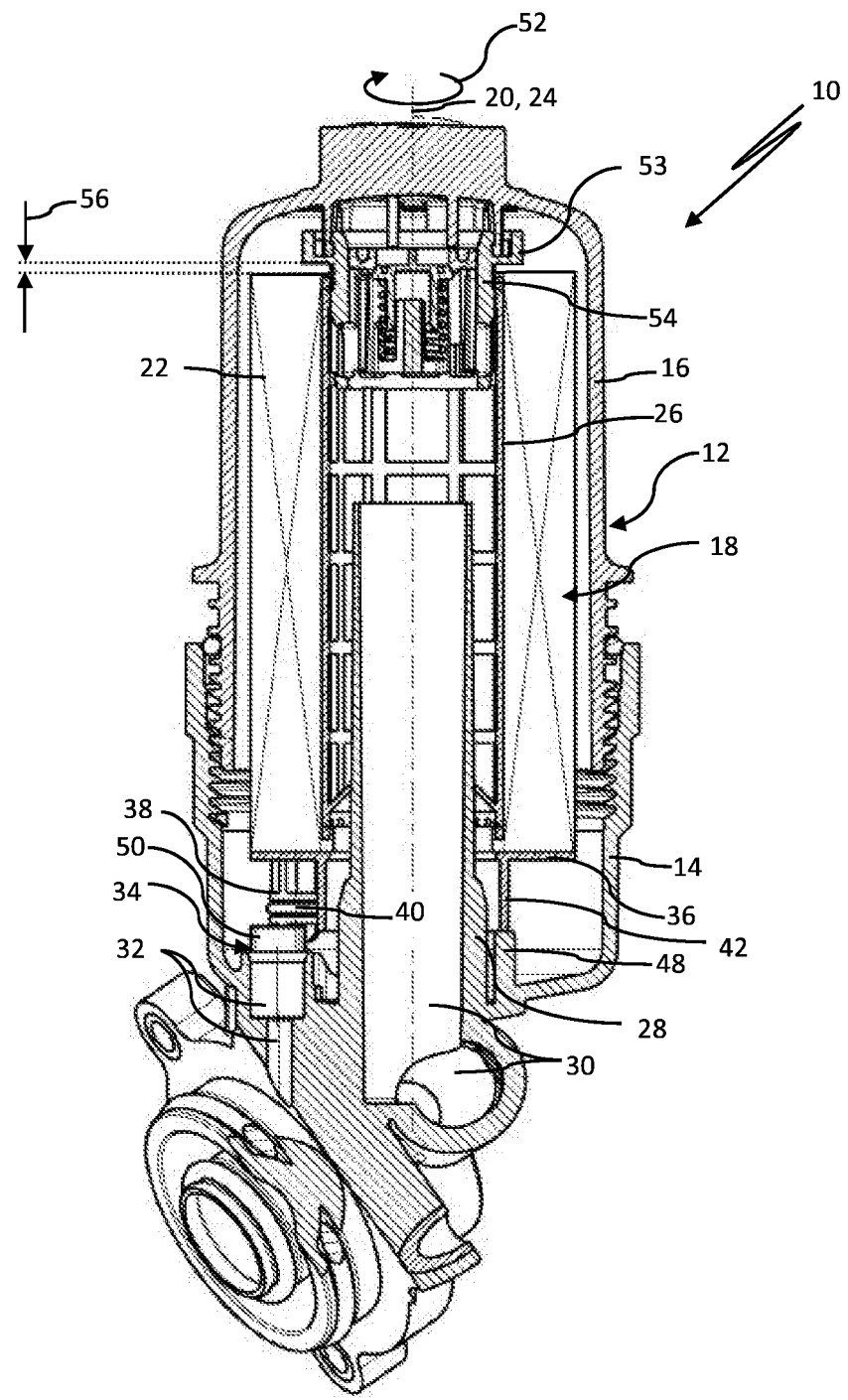
FIG. 4 shows the filter system according to FIG. 1 during mounting of the filter element in the filter housing.

In FIG. 4, the filter system 10 is shown during screwing the housing cover 16 into the housing pot 14, for example, after exchange of the filter element 18. The filter element 18, for example, by means of the support tube 26, is secured with friction at an annular socket 54 of the housing cover 16 with axial clearance 56. The annular socket 54 can be embodied by the housing cover 16 or by an additional component 53, for example, a valve holder that is connected with the housing cover 16, for example, fastened to the housing cover 16 by means of a locking connection. The friction fit between the support tube 26 and the annular socket 54 can be effected, for example, by elastic widening of the support tube 26 pushed onto the annular socket 54. In this way, the support tube 26 is arranged, secured with pre-stress in radial direction, on the annular socket 54. Due to the friction fit, the filter element 18 can be inserted in a simplified way into the filter pot (housing pot) 14 and positioned therein. The filter element 18 can also be arranged at the housing cover with axial clearance 56 so as to be held by being locked. According to FIG. 4, the closure plug 38 does not yet engage seal-tightly the drainage channel 32. The socket 42 of the filter element 18 is still axially spaced apart from the positioning aid 48.

When the housing cover 16 is screwed by a screwing movement in screw-in direction 52 farther into the housing pot 14, the filter element 18 is entrained by the housing cover 16 and moved together with the latter in rotation about the longitudinal axis 20 of the filter housing 12. The filter element 18 in the illustrated embodiment variant is held by friction fit and/or form fit at a valve holder for a bypass valve. The valve holder is connected to the housing cover 16 by a locking connection. The filter element 18 is thus moved by means of the housing cover 16 at the same time in axial direction translatorily farther into the housing pot 14. When the annular rib or the socket 42 contacts the positioning aid 48 of the housing pot 14, initially a further axial movement of the filter element 18 into the filter pot 14 is prevented. Upon further rotation of the housing cover 16 then a reduction, i.e., an at least partial exhaustion, of the axial clearance 56 between the filter element 18, i.e., here the support tube 26, and the housing cover 16 is effected. The housing-associated positioning aid 48 and the socket 42 of the bottom end disk 36 of the filter element 18 therefore interact like a spacer with each other until the cutout 44 of the filter element 18 and the positioning aid 48 of the housing pot 14 are aligned with each other in axial direction. The axial clearance of the filter element 18 arranged at the housing cover 16 is advantageously selected such that the housing cover 16 together with the filter element 18 arranged thereat, even upon axial contact of the socket 42 at the positioning aid 48, can perform at least one, preferably more than one, complete turn about the longitudinal axis 20 of the filter housing 12 in order to bring the cutout 44 of the filter element 18 into mutual engagement with the positioning aid 48. Due to the friction fit which is existing between the filter element 18 and the housing cover 16, it is ensured in this context that the socket 42 rests against the positioning aid 48 and the positioning aid 48 engages the cutout 44 as soon as the latter is arranged in alignment with the positioning aid 48 in axial direction. As soon as the positioning aid 48 engages the slot-shaped cutout 44 (FIG. 2) of the socket 42 of the filter element 18, a further rotation of the filter element 18 with the housing cover 16, which moves (farther) in screw-in direction 52, is prevented. In other words, the filter element 18 is locked in a predetermined rotational position relative to the housing pot 14. In this predetermined rotational position, the closure plug 38 of the filter element 18 is aligned in axial direction with the drainage opening 34 of the housing pot 14. In this way, it is ensured that the filter element 18, upon continued screwing movement of the housing cover 16 in the screw-in direction 52 and the thus resulting axially oriented advancing movement of the filter element, is moved exactly via the drainage opening 34 into its intended sealing position within the drainage channel 32 in order to close the latter fluid-tightly.

Figure 5:
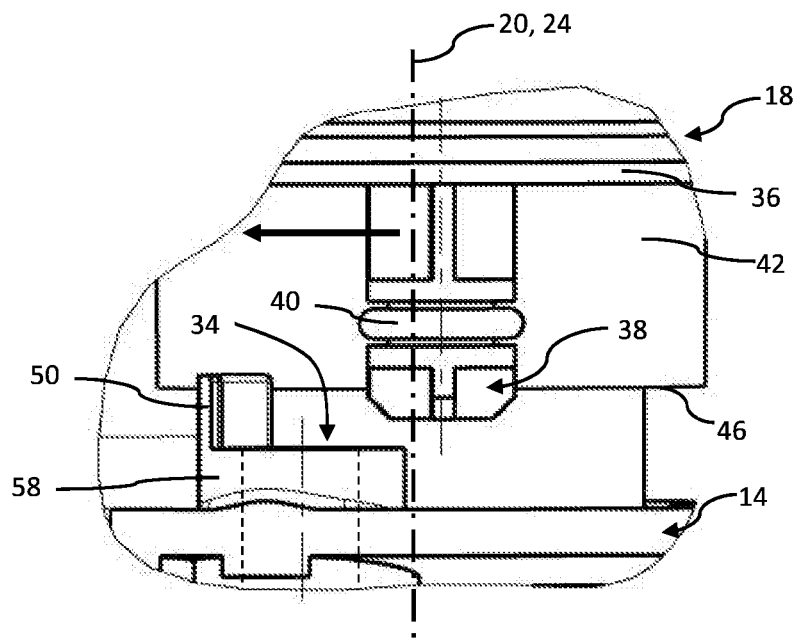
FIG. 5 shows the filter element and the housing pot according to FIG. 1 during mounting of the filter element and shortly before locking of the filter element in a predetermined rotational position relative to the filter pot, in a partial detail illustration.
Figure 6:
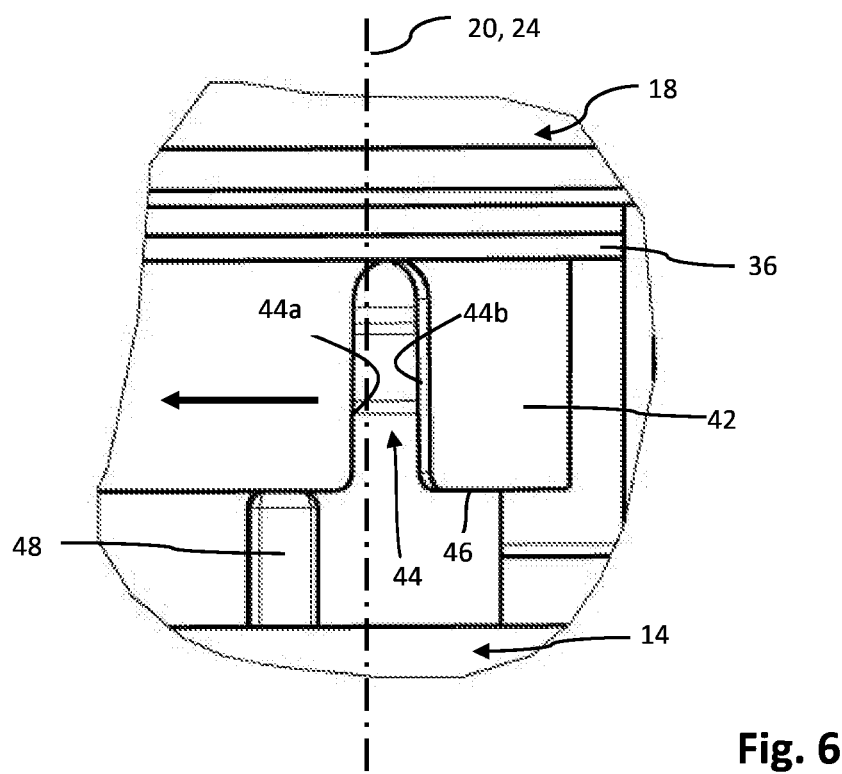
FIG. 6 shows the filter element and the housing pot according to FIG. 1 during mounting of the filter element and shortly before locking of the filter element in a predetermined rotational position relative to the filter pot, in a further partial detail illustration.

In the FIGS. 5 and 6, the housing pot 14 and filter element 18 are each shown in a partial detail view during mounting of the housing cover 16 (FIG. 1) and shortly before engagement of the positioning aid 48 in the slot-shape cutout 44 of the filter element 18. The filter element 18 in FIGS. 5 and 6 is illustrated in the same rotational position relative to the filter pot 14, respectively. In axial direction, the closure plug 38 is still clearly spaced apart from the drainage opening 34 or a housing wall 58 surrounding the drainage opening 34. On the other hand, the positioning aid 48, in the same rotational position of the filter element according to FIG. 6, is already contacting in axial direction the free rim 46 of the socket 42 of the bottom end disk 36 of the filter element. Due to the afore described axial clearance between the housing cover 16 (FIG. 1) and the filter element 18, a further rotation of the housing cover 16 (FIG. 1) even for the already existing mutual contact of the positioning aid 48 and of the socket 42 is enabled in order to be able to bring the positioning aid 48 into engagement with the cutout 44 of the bottom end disk 36. Thus, when the filter element 18 is seated with the annular rib or the socket 42 on the positioning aid 48 in axial direction, a relative movement in axial direction is possible for the filter element 18 only between the annular socket 54 and the filter cover 16, i.e., in the snap connection, upon rotational movement of the housing cover 16.

In summarizing, solely by screwing the housing cover 16 into the housing pot 14, the filter element 18 illustrated in the drawing can be transferred comfortably and in the required rotational position for the axial insertion of the closure plug 38 into the drainage channel 32 relative to the housing pot 14 and arranged in its predetermined operating position in the sealing seat at the filter housing 12 (FIG. 1).

With a different arrangement and configuration of the components which are corresponding with each other, i.e., on the one hand, of the closure plug 38 and of the drainage channel 32 as well as, on the other hand, of the cutout 44 and of the positioning aid 48, the sole use of suitable filter elements 18 in the filter housing 12 can be ensured. This is in particular advantageous in regard to critical applications. When an unsuitable filter element 18 without the socket 42 or with the socket 42 but without the cutout 44 or with a wrongly positioned cutout 44 is inserted into the filter housing 12, the filter element 18 cannot be transferred into its installation or operating position which seals the discharge channel 32. In this case, it is not possible to put the filter system 10 (FIG. 1) into service.

Figure 7:
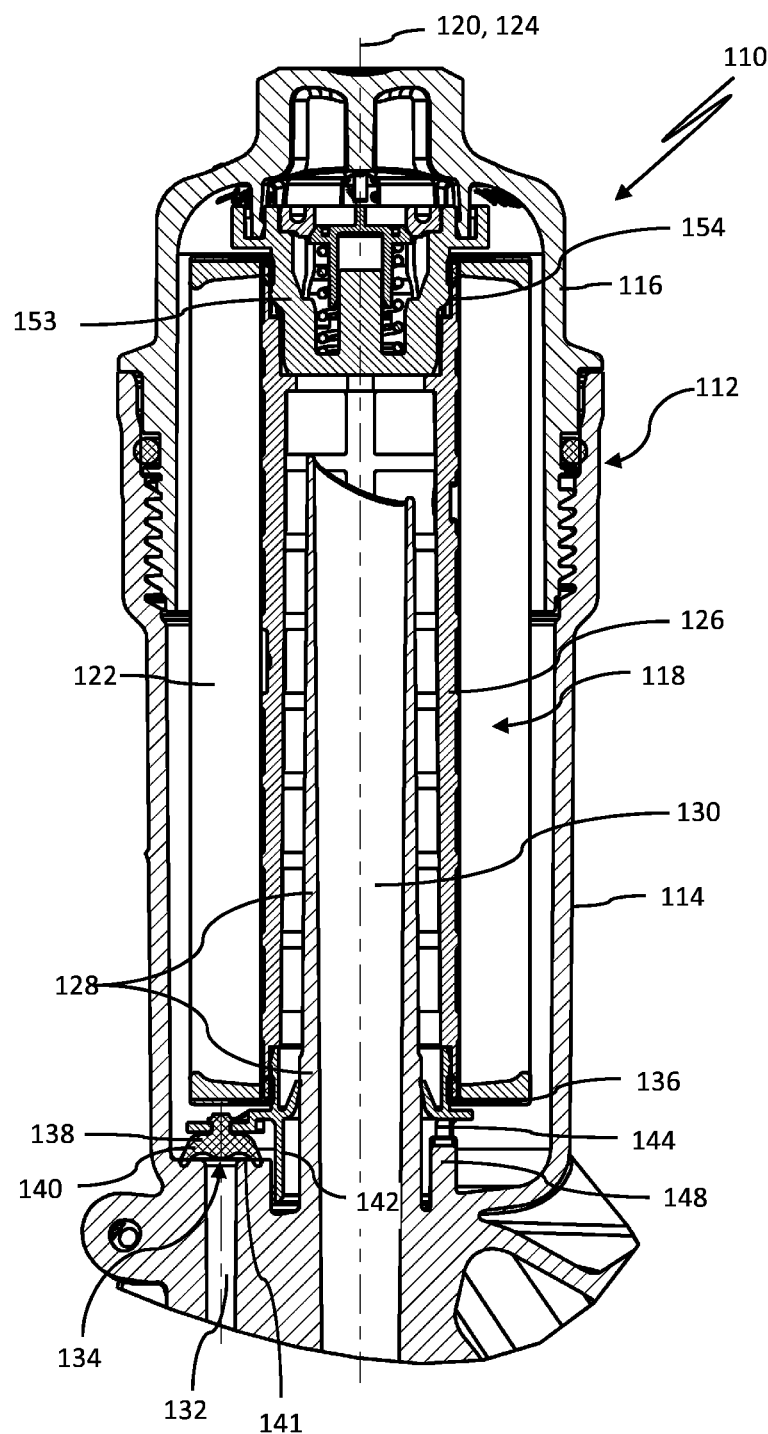
FIG. 7 shows a second embodiment of a filter system with a filter housing as well as with a filter element arranged in the filter housing in its predetermined installation position with a bell-shaped closure element, in a section illustration.

FIG. 7 shows a similar filter system 110 for a liquid medium to be filtered, in particular fuel or oil. The filter system 110 comprises a filter housing 112 with a housing pot (filter pot) 114 and with a housing cover 116 for closing off the housing pot 114. Here, the housing cover 116 can be screwed into the housing pot 114 but can also be screwed onto the housing pot 114. In the filter housing 112, a filter element 118 is arranged in its predetermined installation or operating position. The longitudinal axis 120 of the filter housing 112 is indicated. The filter element 118 comprises a filter medium 112 suitable for the respective liquid medium to be filtered. The filter medium is arranged here in an annular shape relative to the longitudinal axis 124 of the filter element 118. The filter element 118 is thus embodied as a round filter element. The filter medium 122 in filtering operation of the filter system 110 can be flowed through by the liquid medium to be filtered in a radial direction relative to the longitudinal axis 124 of the filter element 118 from the exterior to the interior. For the purpose of a filter surface area as large as possible, the filter medium 122 can be embodied, as is generally known, as a star-shaped folded bellows. A grid-shaped support tube 126 serves as a radial inner support for the filter medium 122.

The housing pot 114 has at the bottom side a centrally arranged housing sleeve 128 with a clean-side outlet channel 130 for the filtered liquid medium. A drainage channel 132 with a drainage opening 134 serves in case of filter element exchange for draining the liquid medium, disposed in the filter housing 112 or in the filter element 118, from the filter housing 112. By means of the housing sleeve, an undesirable transfer of unfiltered (raw-side) liquid medium into the outlet channel 130 arranged at the clean side can be prevented in this context. The drainage opening 132 according to FIG. 7 is arranged spaced apart in radial direction from the centrally arranged housing sleeve 128.

The filter element 118 comprises a bottom end disk 136 that preferably completely covers the filter medium 122 in axial direction. The filter medium 122 can be glued to the bottom end disk 136, welded thereto, or can be arranged so as to be held by being embedded in the material of the bottom end disk 136. The bottom end disk 136 can be comprised, for example, of plastic material. The closure element 138 is integrally formed off-center at the bottom end disk 136 and extends away from the bottom end disk 136 in axial direction. The closure element 138 can be embodied as a substantially bell-shaped or hollow conical sealing element 140. In the illustrated operating state of the filter system 110, the closure element 138 extends across the drainage opening 134 of the drainage channel 132. In this context, the sealing element 140 is resting on a planar support surface 141 surrounding the drainage opening 134. In this context, the sealing element 140 comprises a sealing lip which, when the sealing element 140 is arranged in sealing position, is seal-tightly contacting the contact surface 141 with pre-stress in axial direction. This contact surface 141 can be raised relative to the surrounding housing bottom of the housing pot 114. The drainage channel 132 in the operating state of the filter element 110 is thus fluid-tightly closed off by means of the filter element 118.

Figure 8:
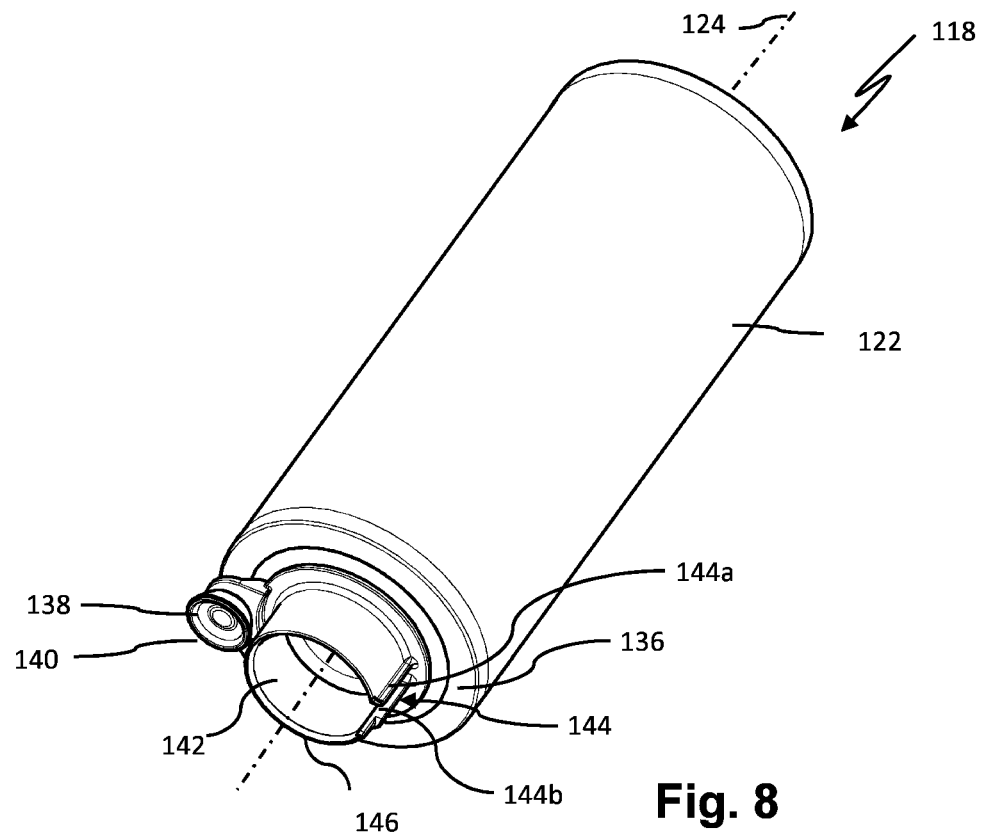
FIG. 8 shows the filter element of FIG. 7 in an isolated perspective view.

According to FIG. 7, at the bottom end disk 136 of the filter element 118 an annular socket 142 is integrally formed. The socket 142 according to the isolated view of the filter element 118 illustrated in FIG. 8 is embodied in the form of a cylindrical collar and extends in axial direction away from the bottom end disk 136 of the filter element 118. The socket 142 comprises a cutout 144. The cutout 144 according to FIG. 8 is embodied in the form of slot which extends away from the free rim 146 of the socket 142 in axial direction. The cutout 144 can extend all the way up to the bottom end disk 136. The cutout 144 is laterally delimited by two lateral flanks 144a, 144b which may be beveled at their rim.

The socket 142 can comprise a guide element which serves for easier insertion of the positioning aid into the cutout. The guide element in screw-in direction 152 of the housing cover 116 is arranged directly behind the cutout 144 and can therefore serve as an additional stop element for the positioning aid. Moreover, the guide element, in the mounted state of the filter system, can be received slightly in a recess in the housing bottom relative to the longitudinal axis of the filter housing.

Figure 9:
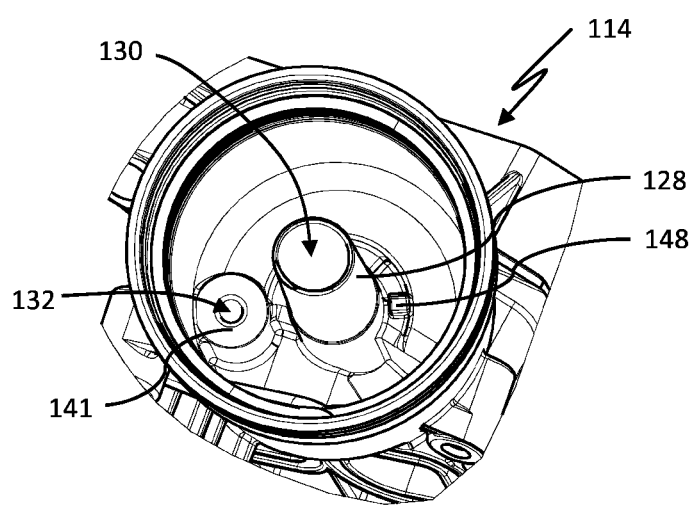
FIG. 9 shows the filter pot of the filter system according to FIG. 7 in an isolated perspective view.

The housing pot 114 according to FIG. 7 comprises a pin-shaped or plug-shaped positioning aid 148 for the filter element 118 which can be seen well in the perspective view of the housing pot 114 illustrated in FIG. 9. The positioning aid 148 is outwardly displaced in radial direction relative to the housing sleeve 128. The positioning aid 148 can extend away from the housing pot 114 in particular at the bottom side in axial direction and is preferably integrally formed at the housing pot for manufacture-technological reasons. In the operating state of the filter system 110 (FIG. 7), the positioning aid 148 engages the cutout 144 of the socket 142 of the filter element 118. It is understood that the positioning aid 148 may have a conical or wedge-shaped form in order to facilitate engagement of the positioning aid 148 in the cutout 144. The diametrically opposed arrangement illustrated in the drawing of the drainage opening 134 and of the positioning aid 148 of the housing pot 114 as well as of the closure element 138 and of the cutout 144 of the filter element 118 is to be understood purely as an example. It is important that the closure element 138 and the cutout 144 of the filter element 118 comprise a spatial distribution pattern which corresponds with the spatial distribution pattern of the drainage opening 134 of the drainage channel 132 and of the positioning aid 148 of the housing pot 114. In the operating state of the filter system 110, the simultaneous coverage and sealing of the drainage channel 132 by the closure element 138 of the filter element 118 and the engagement of the positioning aid 148 of the housing pot 114 in the cutout 144 of the filter element 118 is ensured in this way.

Figure 10:
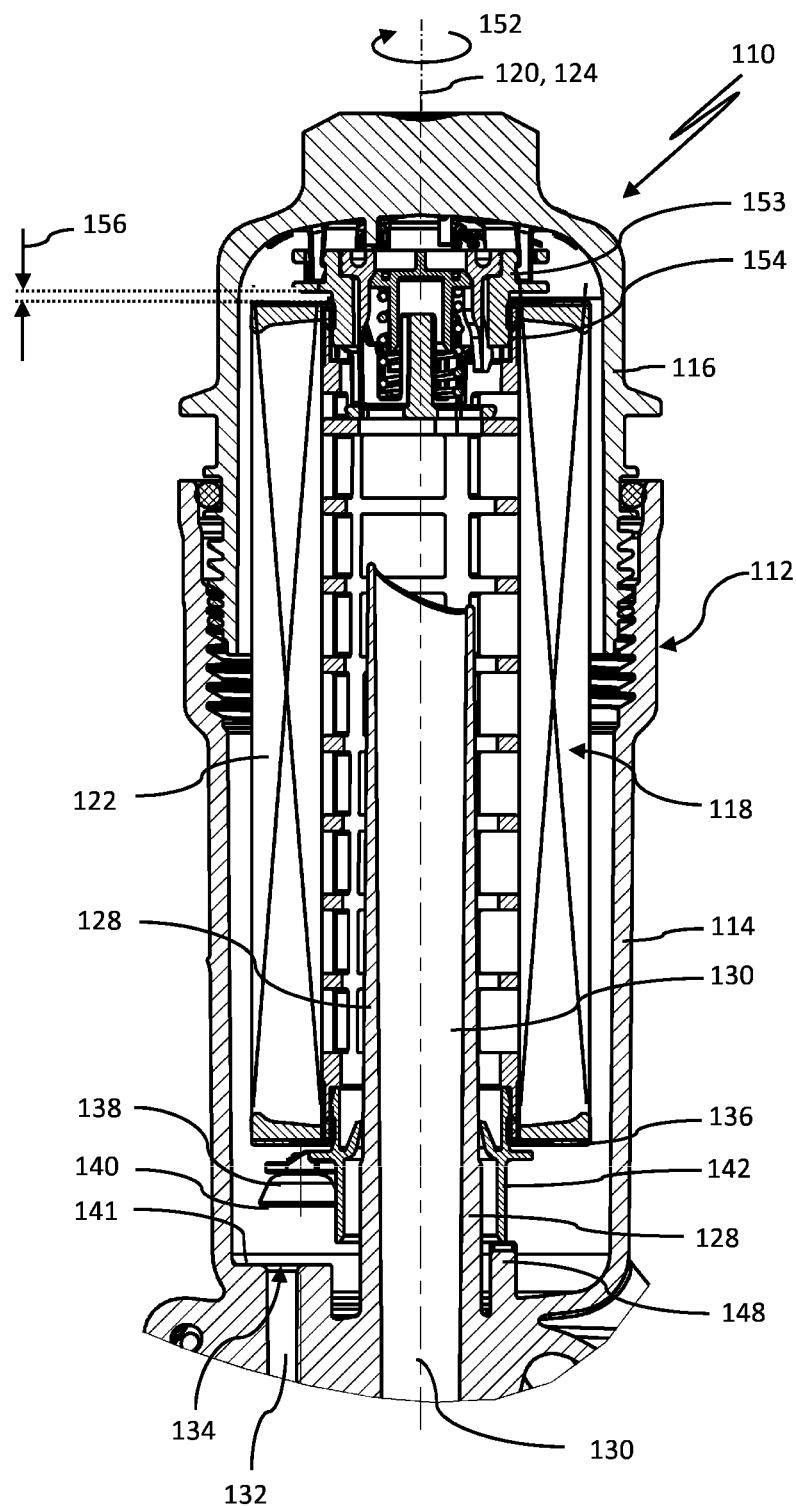
FIG. 10 shows the filter system according to FIG. 7 during mounting of the filter element in the filter housing.

In FIG. 10, the filter system 110 is illustrated during screwing the housing cover 116 into the housing pot 114, for example, after exchange of the filter element 118. The filter element 118 is held with friction fit, for example, here by means of the support tube 126, at an annular socket 154 with axial clearance 156. The annular socket 154 can be embodied by the housing cover or can be embodied by an additional component 153, for example, a valve holder that is connected with the housing cover 116, for example, fastened by a locking connection to the housing cover 16. The friction fit between the support tube 126 and the annular socket 154 can be effected, for example, by an elastic widening of the support tube 126 pushed onto the annular socket 154. In this way, the support tube 126 is held with pre-stress in radial direction on the annular socket 154. Due to the friction fit, the filter element 118 can be inserted easier into the filter pot 114 and positioned therein. The filter element 118 can also be arranged at the housing cover 116 with axial clearance 156 so as to be held by being locked. The socket 142 of the filter element 118 is still axially spaced apart relative to the positioning aid 148.

When the housing cover 116 is screwed by a screwing movement oriented in the screw-in direction 152 farther into the housing pot 114, the filter element 118 is entrained by the housing cover 116 and moved together therewith in rotation about the longitudinal axis 120 of the filter housing 112. The filter element 118 in the illustrated embodiment variant is held by friction fit and/or form fit at a valve holder for a bypass valve. The valve holder is connected to the housing cover 116 by a locking connection. The filter element 118 is thus moved by means of the housing cover 116 at the same time in axial direction translatorily farther into the housing pot 114. When the annular rib or the socket 142 contacts the positioning aid 148 of the housing pot 114, first a further axial movement of the filter element 118 into the filter pot is prevented. By a further rotation of the housing cover 116, a reduction, i.e., an at least partial exhaustion, of the axial clearance 156 between the filter element 118, i.e., here the support tube 126, and the housing cover 116 is then effected. The housing-associated positioning aid 148 and the socket 142 of the bottom end disk 136 of the filter element 118 interact therefore like a spacer with each other until the cutout 144 of the filter element 118 and the positioning aid 148 of the housing pot 114 are aligned with each other in axial direction. The axial clearance of the filter element 118 arranged at the housing cover 116 is advantageously selected such that the housing cover 116 together with the filter element 118 arranged thereat, even for axial contact of the socket 142 at the positioning aid 148, can still perform at least one, preferably more than one, complete turn about the longitudinal axis 120 of the filter housing 112 in order to bring the cutout 144 of the filter element 118 into mutual engagement with the positioning aid 148. Due to the friction fit that is existing between the filter element 118 and the housing cover 116, it is ensured in this context that the socket 142 is resting against the positioning aid 148 and the positioning aid 148 engages the cutout 144 as soon as the latter is aligned in axial direction relative to positioning aid 148. As soon as the positioning aid 148 engages the slot-shaped cutout 144 (FIG. 8) of the socket 142 of the filter element 118, a further entrained rotation of the filter element 118 with the housing cover 116 that is moving (farther) in the screw-in direction 152 is prevented. In other words, the filter element 118 is locked in a predetermined rotational position relative to the housing pot 114. In this predetermined rotational position, the closure element 138 of the filter element 118 is arranged in alignment in axial direction relative to the drainage opening 134 of the housing pot 114. In this way, it is ensured that the filter element 118, upon a continued screwing movement of the housing cover 116 in the screw-in direction 152 and the thus resulting axially oriented advancing movement of the filter element, is moved exactly above the drainage opening 134 into its intended sealing position at the drainage channel 132 in order to close it off fluid-tightly.

In summarizing, solely by the rotation of the housing cover 116 in the screw-in direction into the housing pot 114, the filter element 118 illustrated in the drawings can be transferred comfortably and in the required rotational position for sealing the drainage channel 132 by the closure element 138 relative to the housing pot 114 for and arranged in its predetermined operating position at the sealing seat at the filter housing 112 (FIG. 7).

By a different arrangement and configuration of the components that are corresponding with each other, i.e., on the one hand, of the closure element 138 and of the drainage channel 132 as well as, on the other hand, of the cutout 144 and of the positioning aid 148, the sole use of suitable filter elements 118 in the filter housing 112 can be ensured. This is in particular advantageous in case of critical applications. When an unsuitable filter element 118 without socket 142 or with the socket 142 but without cutout 144 or with a wrongly positioned cutout 144 is inserted into the filter housing 112, the filter element 118 cannot be transferred into its installation or operating position sealing the drainage channel 132. In this case, it is not possible to put the filter system 110 (FIG. 7) into service.

What is claimed is:

1. A filter system for a liquid medium to be filtered, the filter system comprising:
    a filter housing comprising
        a housing pot and
        a housing cover,
        wherein the housing cover is configured to be screwed by a screwing movement onto the housing pot or into the housing pot to close off the housing pot,
        wherein the housing pot comprises
            a drainage channel with
                a drainage opening arranged at a bottom of the housing pot for draining the liquid medium;
    a filter element comprising
        a bottom end disk,
        wherein the bottom end disk comprises
            a closure element formed as a closure plug on the bottom end disk and projecting axially outwardly, the closure plug arranged off-center at the bottom end disk relative to a longitudinal axis of the filter element,
            wherein the closure element, in a predetermined installation position of the filter element in the filter housing, extends seal-tightly across the drainage opening of the drainage channel or extends seal-tightly into the drainage opening of the drainage channel;
        wherein the bottom end disk of the filter element further comprises:
            an annular socket having an annular outer wall having a first axial end secured onto the bottom end disk, the annular socket projecting axially outwardly from the bottom end disk to an axially outer end face forming a free rim of the annular socket, wherein the free rim of the axial outer end face is arranged in plane parallel to the bottom end disk,
            wherein the annular socket has a cutout extending radially through the annular outer wall, the cutout extending axially from the free rim in a direction towards the bottom end disk;
    wherein the housing pot further comprises
        a pin-shaped positioning aid formed on a bottom wall of the housing pot and projecting axially towards the bottom end disk, the pin-shaped positioning aid sized and aligned radially with the cutout to be engageably receivable into the cutout;
    wherein the filter element is configured to move by a screwing movement of the housing cover in an axial direction toward the drainage opening and to rotate together with the housing cover about the longitudinal axis of the filter element until the pin-shaped positioning aid engages the cutout of the annular socket and locks the filter element relative to the housing pot in a predetermined rotational position,
    wherein in the predetermined rotational position the closure element is axially aligned relative to the drainage opening;
    wherein the filter element is configured to move by the screwing movement of the housing cover in the axial direction into the predetermined installation position of the filter element in the filter housing.

2. The filter system according to claim 1, wherein a configuration of the cutout and a configuration of the pin-shaped positioning aid correspond with each other such that an engagement of a thread of the housing cover and of a thread of the housing pot is possible only when the cutout registers with the pin-shaped positioning aid.

3. The filter system according to claim 1, wherein the drainage opening of the drainage channel is surrounded by a planar contact surface.

4. The filter system according to claim 1, wherein a spatial arrangement of the drainage opening of the drainage channel relative to the pin-shaped positioning aid at the housing pot corresponds with a spatial arrangement of the closure element relative to the cutout at the bottom end disk.

5. The filter system according to claim 1, wherein the housing pot comprises a housing sleeve, wherein the pin-shaped positioning aid is displaced relative to the housing sleeve outwardly in a radial direction relative to a longitudinal axis of the filter housing,
    wherein the pin-shaped positioning aid is spaced radially outwardly away from the housing sleeve, the spacing forming a groove-shaped gap therebetween,
wherein the annular socket of the filter element is received into the groove shaped gap such that the annular socket is arranged between and separates the pin-shaped positioning aid from the housing sleeve.

6. The filter system according to claim 1, wherein the pin-shaped positioning aid and the housing pot are formed together as one piece.

7. A filter element for a filter system for a liquid medium to be filtered, wherein the filter system comprises a filter housing comprising a housing pot and a housing cover, wherein the housing cover is configured to be screwed by a screwing movement onto the housing pot or into the housing pot to close off the housing pot, wherein the housing pot comprises a drainage channel with a drainage opening arranged at a bottom of the housing pot for draining the liquid medium, wherein the housing pot further comprises a positioning aid;

the filter element comprising:
    a bottom end disk comprising
        a closure element formed as a closure plug on the bottom end disk and projecting axially outwardly, wherein the closure element is arranged off-center relative to a longitudinal axis of the filter element,
    wherein the bottom end disk further comprises:
        an annular socket having an annular outer wall having a first axial end secured onto the bottom end disk, the annular socket projecting axially outwardly from the bottom end disk to an axially outer end face forming a free rim of the annular socket, wherein the free rim of the axial outer end face is arranged in plane parallel to the bottom end disk,
        wherein the annular socket has a cutout extending radially through the annular outer wall, the cutout extending axially from the free rim in a direction towards the bottom end disk;
        wherein the cutout is configured to interact with the positioning aid of the filter system;
    wherein the closure element, in a predetermined installation position of the filter element in the filter housing, extends seal-tightly across the drainage opening of the drainage channel or extends seal-tightly into the drainage opening of the drainage channel;

wherein the filter element is configured to move by a screwing movement of the housing cover in the axial direction toward the drainage opening and to rotate together with the housing cover about the longitudinal axis of the filter element until the positioning aid engages the cutout of the bottom end disk and locks the filter element relative to the housing pot in a predetermined rotational position, wherein in the predetermined rotational position the closure element is axially aligned relative to the drainage opening;

wherein the filter element is configured to move by the screwing movement of the housing cover in the axial direction into the predetermined installation position of the filter element in the filter housing.

8. The filter element according to claim 7, wherein the cutout is embodied, at least in sections, as a slot.

9. The filter element according to claim 7, wherein the cutout comprises beveled lateral flanks.

10. The filter element according to claim 7, wherein the annular socket and the bottom end disk are formed together as one piece.

11. The filter element according to claim 7, wherein the socket is embodied as a cylindrical section extending about the longitudinal axis of the filter element.

12. The filter element according to claim 7, wherein a sealing surface of the closure element and an axial end of the cutout are arranged spaced apart from each other relative to the longitudinal axis of the filter element.

13. The filter element according to claim 7, wherein the closure element is bell-shaped.

14. The filter element according to claim 7, wherein the closure element is form-fitted to the bottom end disk.

\* \* \* \* \*